United States Patent
Chan et al.

[11] Patent Number: 5,859,958
[45] Date of Patent: Jan. 12, 1999

[54] COMPACT REPRESENTATION OF OBJECT SLICES FOR RENDERING RASTER GRAPHICS

[75] Inventors: Thomas C. Chan, Santa Clara; Kok S. Chen, Sunnyvale, both of Calif.

[73] Assignee: Apple Computer, Inc., Cupertino, Calif.

[21] Appl. No.: 557,581

[22] Filed: Nov. 14, 1995

[51] Int. Cl.[6] .................................................. G06K 15/00
[52] U.S. Cl. .......................................... 395/117; 395/116
[58] Field of Search ...................... 395/112, 114, 395/115, 116, 117, 101, 782, 783, 787, 802, 707, 520, 521, 525, 539, 133, 134, 135; 382/175, 173, 284

[56] References Cited

U.S. PATENT DOCUMENTS

| | | | |
|---|---|---|---|
| 5,452,405 | 9/1995 | Vondron, Jr. | 395/114 |
| 5,483,622 | 1/1996 | Zimmerman et al. | 395/115 |
| 5,504,842 | 4/1996 | Gentile | 395/115 |

*Primary Examiner*—Arthur G. Evans
*Attorney, Agent, or Firm*—Burns, Doane, Swecker & Mathis, L.L.P.

[57] ABSTRACT

Storing and updating parameters of object slices used to render more complex objects is made more efficient in raster graphics systems. Recognizing that some parameters of adjacent object slices remain unchanged, these values need not be stored or updated, thereby saving transmission overhead and/or memory.

17 Claims, 6 Drawing Sheets

COMPACT REPRESENTATION OF OBJECT SLICES FOR RENDERING RASTER GRAPHICS

BACKGROUND

The present invention is directed to graphic imaging devices, such as printers and display monitors, and more particularly to the manner in which image data is stored in such devices during the process of generating an image.

In a computer-based imaging system, data which describes an image is generated in a host computer, for example using a desktop publishing program, and then forwarded to an image generating device where it is converted into a format that can be used by the device. In an exemplary system, the image data from the host computer might be in the format of a high-level page description language (PDL). One example of a well-known PDL is PostScript. In the host computer, graphic commands from the desktop publishing program, or other suitable application program, are converted into PDL commands. These commands are sent to the printer which interprets them and determines which types of graphics operations are to be performed, such as draw a rectangle or a particular character of text. The interpretation process typically also determines associated graphic state arguments that apply to each object, such as color, font, size, and the like. This information is then converted into pixel display values which are stored in a frame buffer to represent the shapes and colors of the objects. The values in the frame buffer are used to control the operation of the active elements in a print engine, such as a laser diode in a laser printer or a print head in an inkjet printer, to form the image. The process of converting the high-level PDL commands into the frame buffer display values is known as rendering.

To increase the overall rate at which printing is carried out, particularly for complex documents containing different types of objects, the various steps of the rendering process might be pipelined. At one or more stages of the process, the image data is converted to an intermediate form which can be utilized more efficiently by the next stage. For example, in one well-known type of operation relating to laser printers, high-level graphics operations are determined from the PDL data, and stored in a display list from which they are provided to the stage which generates the individual pixel display values.

The amount of information to be stored in an intermediate form is a significant consideration for purposes of efficient memory allocation in these types of applications. More particularly, each entry in the display list represents a shape or a graphics state command, e.g., color, to be applied to subsequent entries. In addition to this image data, each entry has some associated overhead information which is stored along with it. This overhead information might comprise a header which describes the type of entry, and a pointer or other reference to the next entry on the list. To the extent possible, it is desirable to minimize the amount of information to be stored.

In other types of imaging systems, lower level commands are transmitted between a control device, e.g., a computer, and an image forming device. Bit-maps, for example, involve transmitting information relating to each pixel to be imaged. In these types of systems, it is desirable to minimize the amount of information to be transmitted.

To determine an appropriate amount of data to be stored or transmitted, it is useful to consider how rendering is performed. In the world of raster graphics rendering, it is common to approximate curves and circular arcs using straight lines. Conventional raster graphics rendering techniques involve slicing such a straight-line approximated complex object into simpler representations such as lines, rectangles or trapezoids. Each line, rectangle or trapezoid is then rendered sequentially, for example from top to bottom of the complex object.

Figure 1:
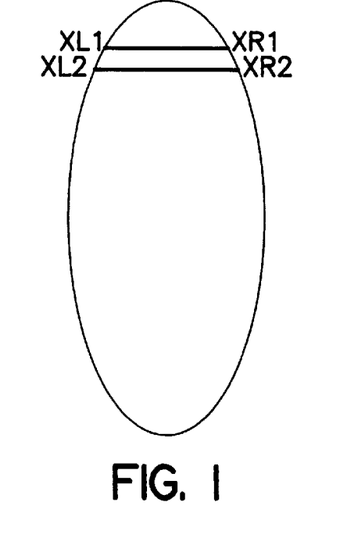
FIG. 1 is an example of rendering an object using linear object slices.

An example of raster graphics rendering using linear object slices is illustrated in FIG. 1. Therein an ellipse is rendered by sequentially drawing of said linear object slices in the form of raster lines, for example from the top of the ellipse to the bottom of the ellipse. Two coordinates are used to define each raster line; each line is to be sequentially rendered. In the example of FIG. 1, the two lines shown have coordinates XL1, XR1 and XL2, XR2, respectively. For each line that is to be rendered to create the ellipse of FIG. 1, the two parameters used to uniquely define the line are transmitted or stored depending upon the type of imaging system under consideration. For example, a PDL interpreter might receive a high level command to draw the ellipse of FIG. 1 and would then store each set of line coordinates in a display list.

Figure 2:
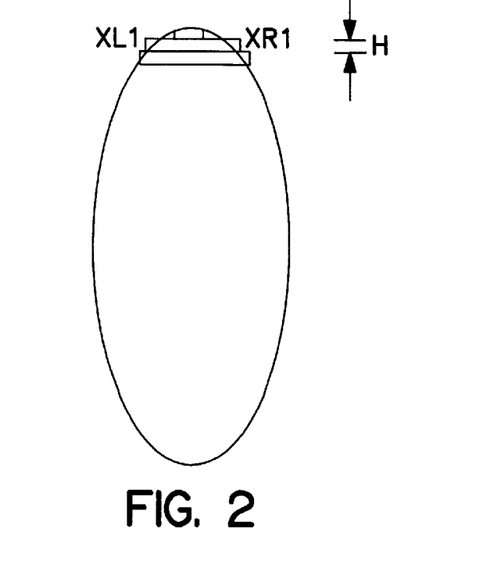
FIG. 2 is an example of rendering an object using rectangular object slices.

Suppose that, instead of using linear object slices, a raster graphic subsystem used rectangles to render more complex objects. This type of rendering is illustrated in FIG. 2. In addition to the end points of the rectangle, the raster graphics subsystem also needs to know the height H of each rectangle. According to conventional techniques, for each rectangle that is to be rendered on a display, three parameters are transmitted to, or stored in intermediate form in, the raster graphics subsystem. In the example of FIG. 2, these three parameters are, for the middle rectangle, denoted as XL1, XR1 and H.

Figure 3:
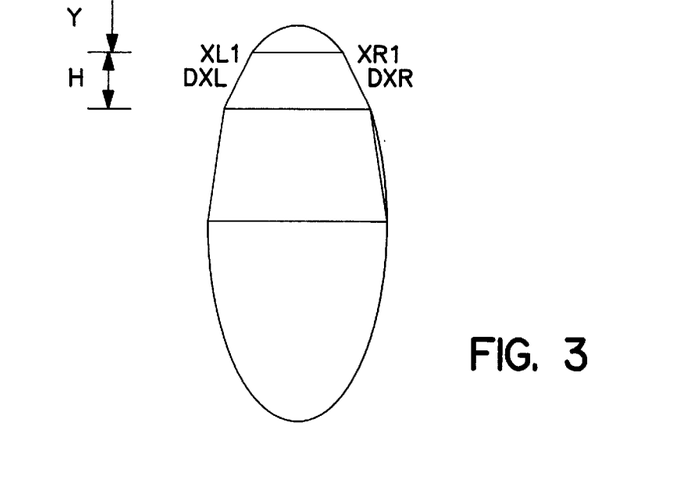
FIG. 3 is an example of rendering an object using trapezoidal object slices.

A third example is provided in FIG. 3. Therein, the elliptical object is rendered using a series of trapezoids as object slices. Each trapezoid is defined by an upper, lefthand coordinate, e.g., XL1, an upper, righthand coordinate, e.g., XR1, and a height H. Along each side of the trapezoid, there are also parameters which describe the change in gradient (i.e., slope) of the trapezoid as it traverses downwardly in the vertical direction. These parameters are denoted DXL and DXR for the left and right sides, respectively, of the middle trapezoid illustrated in FIG. 3.

In conventional rendering devices one slice of an object, e.g., a line, a rectangle or a trapezoid, is rendered at a time. Going from one slice to the next adjacent slice, all of the parameters that describe the location at which the next line, rectangle or trapezoid is to be rendered, are retransmitted, or stored in an intermediate form such as a display list, before further rendering can take place. For example, the parameters XL1, XR1, H, DXL and DXR would conventionally be retransmitted or stored for each trapezoidal object slice. However, as recognized by Applicants, each of these parameters does not always change from object slice to object slice. In fact, depending upon the geometry of the complex object being rendered, redundant information of object slice parameters is frequently transmitted or stored using these conventional rendering techniques. Thus, conventional rendering techniques which update graphical object slice parameters by transmitting all of the parameter information for each object slice between, for example, a host computer and a graphics rendering subsystem, create unnecessary overhead in the data transmission which hinders the performance of these conventional devices. Similarly, those conventional systems which convert all of the parameters for every object slice into some intermediate form, e.g., a display list, and store that information are inefficient and wasteful of system memory.

SUMMARY

These and other drawbacks and limitations of conventional techniques for rendering objects are overcome by taking advantage of continuous properties between adjacent slices of a complex object to be rendered. According to exemplary embodiments of the present invention, storing and updating of parameters which represent the object slices to be rendered are performed more efficiently by recognizing that, in some cases, one or more of the parameters of the next object slice to be rendered are the same as those of the previous object slice.

According to an exemplary embodiment of the present invention, an ordered list of object slices is provided wherein each object slice in the list contains parameters that define the object slice to be rendered. For each parameter, there is also provided a corresponding flag which indicates whether that parameter's value has changed from the ending value used to render the previous object slice. By evaluating these indicators prior to transmitting parameter information from, for example, a host computer to a graphics rendering subsystem, only those parameters whose values change from one object slice to the next are transmitted. Similarly, in systems where information is stored in an intermediate form, the amount of information to be stored can be reduced.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 4A:
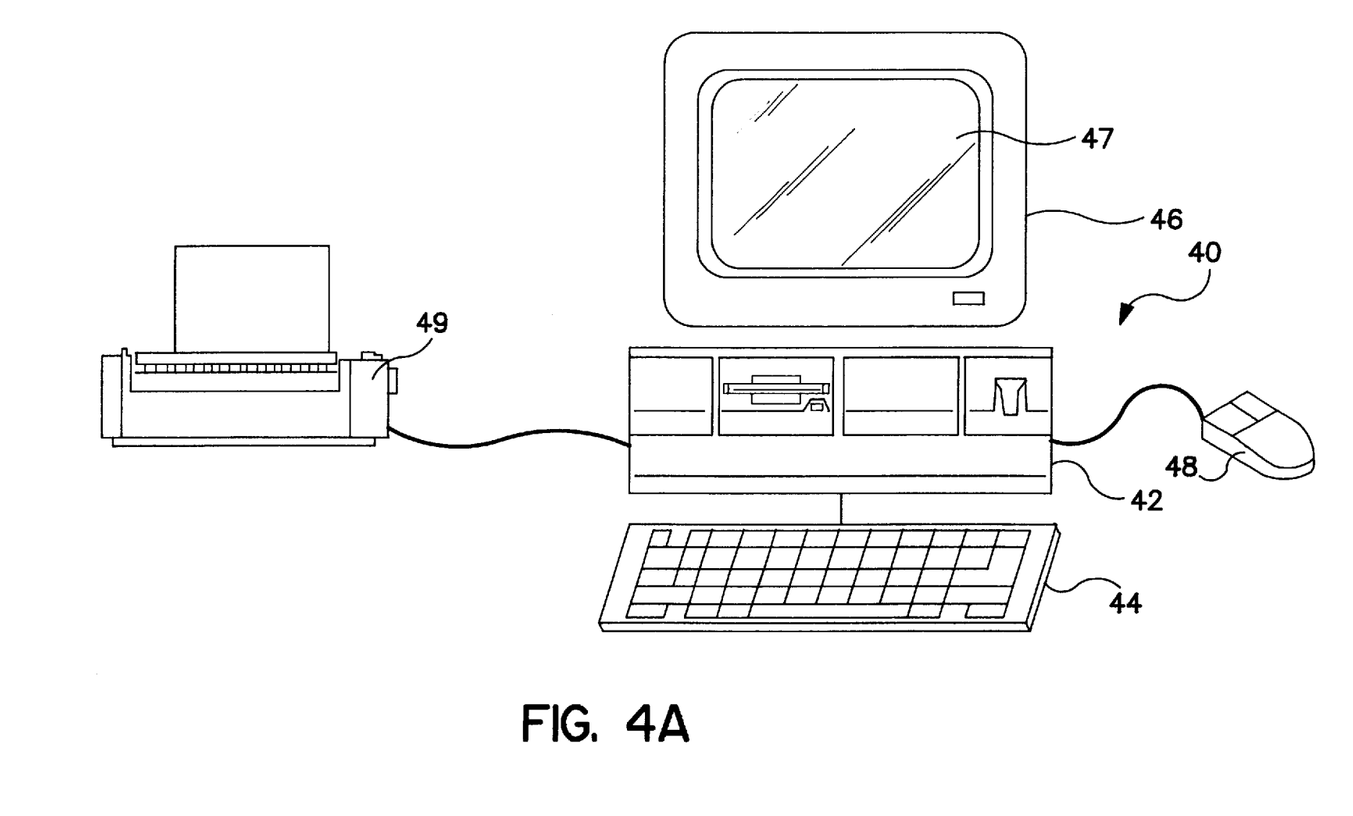
FIG. 4(a) illustrates an exemplary computer system which can be used to implement raster graphic techniques according to the present invention.

With reference now to the figures and in particular with reference to FIG. 4(a), a computer system is illustrated which may be used in conjunction with methods and systems for rendering according to the present invention. Computer system 40 includes a computer 42, keyboard 44, a color display monitor 46 having a display screen 47, a cursor control device 48, shown here as a mouse, and a printer 49. Computer system 40 may be implemented using any suitable computer, such as a Macintosh Quadra™ computer, a product of Apple Computer, Incorporated, located in Cupertino, Calif.

To facilitate an understanding of the present invention, it is described hereinafter with specific reference to its application to a display list for a printer. It will be appreciated, however, that the practical applications of the invention are not limited to this particular embodiment. Rather, the invention will find utility in any system in which image data is stored in an intermediate form for processing purposes, such as a display monitor, a graphics application program, or in which image data is transmitted, as between a host computer and a printer. Further in this regard, the invention is not limited to display lists, as that term is specifically understood in the context of printers. It can be applied to any intermediate form of image data that is stored or transmitted for processing purposes.

FIG. 4(a) is a block diagram of the major components of an exemplary color printer in which the present invention can be implemented. Referring thereto, the printer 410 includes an I/O controller 412 that is connected to one or more I/O ports for communication with computers and other external sources of data to be printed. A spooler 414 accumulates image data received from the external sources, and stores the data until it is ready to be processed for printing. It will be appreciated, of course, that the spooler is optional and can be incorporated in an external device, rather than the printer itself. An interpreter 416 receives a stream of image data and issues calls which cause the desired image to be drawn, or printed, on the paper. These calls can be of two basic types. One set of calls identifies the appearance state of objects to be drawn. This appearance state indicates the color of the object, as well as other appearance-related factors, such as patterns, transfer modes, e.g. transparency, and the like. The other set of calls describes the object to be drawn, such as a rectangle, a particular character of text, or the like. In the illustrated embodiment of the printer, these calls are stored in an intermediate data structure, known as a display list 418, or a metafile.

The information in the display list is provided to a renderer 420. The renderer converts the object-based information from the interpreter 416 into individual pixel display values, which are stored in a frame buffer 422. The pixel display values stored in the frame buffer can undergo optional processing within one or more processors 424. For example, the display values can be compressed and/or decompressed, or undergo half-tone processing. Ultimately, these display values are supplied to a print engine 426, e.g., in the form of bit-maps, to control the actual printing of the desired image. The print engine could be of the laser beam printer type. Alternatively, the print engine could be of the ink jet type.

Figure 4B:
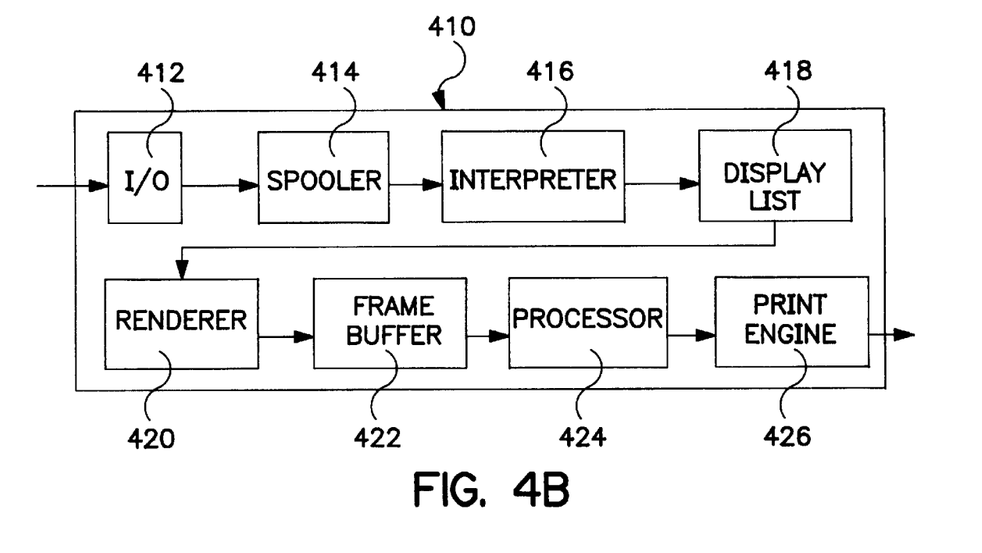
FIG. 4(b) illustrates an exemplary rendering device which can be used to implement the present invention.

Those skilled in the art will appreciate that many other printing configurations exist and can also implement the present invention. For example, the functionality associated with blocks 412–418 can be performed in a computer, with only blocks 420–426 residing in the printer. In this case the data which would be stored in block 418 of FIG. 4(b) is instead transmitted over a bidirectional communication link to the renderer in the printer. In such an alternative printing scheme, it is desirable to minimize the amount of information to be transmitted to improve performance.

As described above, conventional rendering devices do not share parameter information between adjacent object slices. Instead, when the rendering device moves from one object slice to an adjacent object slice, all of the parameters which will be used to render the adjacent object slice are updated, regardless of whether they have changed or not. In the context of the exemplary system of FIG. 4(b), this means that, for example, each of the five trapezoidal object slice parameters will be stored as part of the display list 418 by interpreter 416 for each object. However, exemplary embodiments of the present invention take advantage of the continuity between adjacent object slices. Often, as recognized by Applicants, not all of the parameters of the adjacent object slice change from those which remain when rendering of the previous object slice is completed. Accordingly, only those parameters which differ need be updated.

Figure 5:
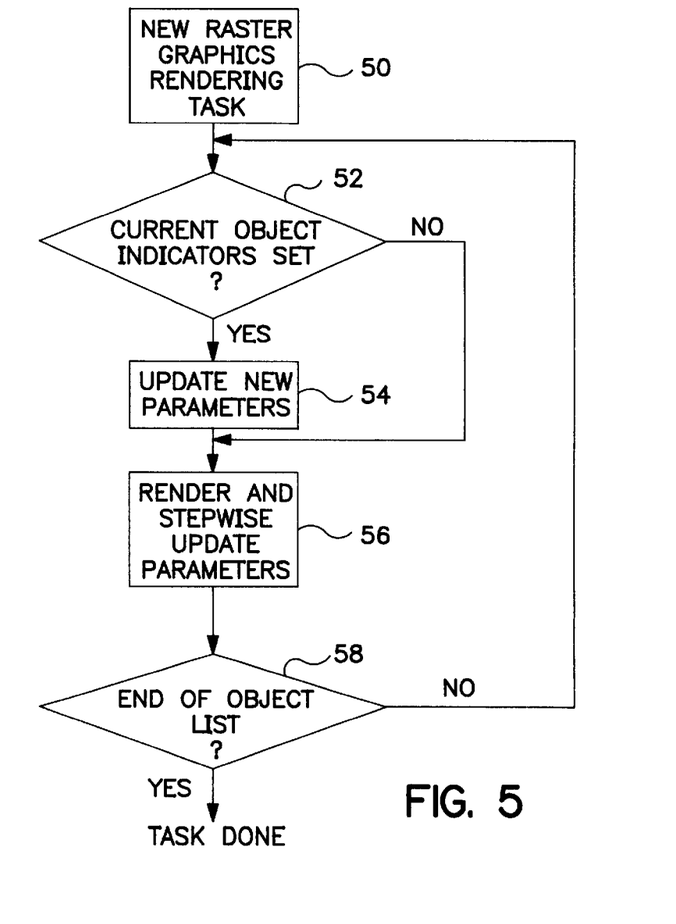
FIG. 5 is a flowchart depicting an exemplary technique for rendering raster graphics according to an exemplary embodiment of the present invention.

An exemplary technique for taking advantage of this recognition is illustrated in FIG. 5. Therein, at block 50, a new raster graphics rendering task is received by a rendering device. For example, an application may request that the rendering device create the oval illustrated in FIG. 2. The flow then proceeds to the decision block 52 wherein the object slice indicators are examined to determine if any of the indicators have been set. As described in more detail below, these indicators provide a mechanism for determining whether each of the parameters needed to render an object slice have the same value for the next object slice as they did for the previous object slice. According to this exemplary embodiment, the indicators are set, e.g. to a logical "1", if that parameter needs to be updated. Accordingly, if any of the parameters need to be updated then the flow proceeds to block 54 where only those parameters that require updated information are modified. Alternatively, if none of the object indicators are set, i.e., the same values can be used to render the next object slice, then the flow follows the "No" branch and skips the update parameter step 54. In any event, the process then reaches block 56 wherein the object slice is rendered. Since this exemplary embodiment relates to raster graphics rendering techniques, each object slice is itself rendered as a series of lines. The object slice parameters are stepwise updated for each line until, for example, the height H of the object slice to be rendered reaches zero. When there are no more slices to be rendered, i.e., when the complex object has been completely drawn, then the flow follows the "Yes" path from decision block 58 and the task is completed.

Figure 6:
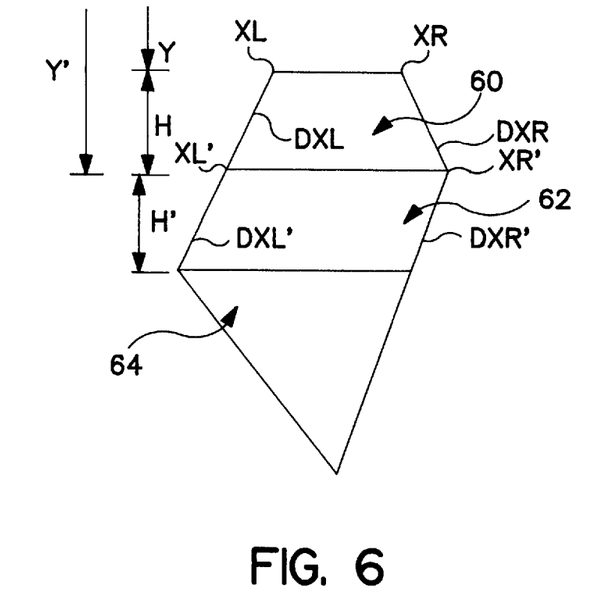
FIG. 6 is another example of rendering an object using trapezoidal object slices.

To provide a more detailed example of the present invention, the inventive techniques will be applied to the object illustrated in FIG. 6. Suppose that the object of FIG. 6 is to be created using the printing device of FIG. 4(*b*) which creates objects using object slices in the form of trapezoids. A trapezoid can be described by, for example, the set of parameters set forth below in Table 1.

TABLE 1

| | |
|---|---|
| Y: | vertical distance from the top of the rendering band |
| XL: | starting horizontal position of trapezoid |
| XR: | ending horizontal position of trapezoid |
| DXL: | change (delta) in gradient on the left hand side |
| DXR: | change (delta) in gradient on the right hand side |
| H: | height of the trapezoid slice |

Exemplary trapezoidal object slices which can be defined using these parameters are indicated in FIG. 6. The overall object shown in FIG. 6 can thus be rendered, for example, using three trapezoidal object slices referred to by numerals 60, 62 and 64. As in the previous descriptions, suppose that the object of FIG. 6 is rendered from the top down such that trapezoid 60 is rendered first, followed by trapezoid 62 and finally trapezoid 64. In this example, then, the ordered list of object slices created by the interpreter 416 for storage in the display list would include parameters for each of the three trapezoids 60, 62 and 64. Parameters Y, XL, XR, DXL, DXR and H describe the first trapezoidal object slice 60. Assuming, in this example, no previous object slice has been rendered, it is then necessary to store values for each of these parameters in display list 418. The interpreter also stores, for example as header information, data that provides an indication to the rendered of which registers to update with data received from the display list. The header data can, for example, be pictorially illustrated as shown in Table 2.

TABLE 2

| Set Y | Set XL | Set XR | SET DXL | Set DXR | Set H | Start | EOT |
|---|---|---|---|---|---|---|---|

The first six flags indicate whether corresponding new parameter values follow the header information. For example, if the "Set Y" field has a logical "1" value, then this can be used to indicate that a new Y parameter value follows. When the "Start" bit is set, this signals the beginning of rendering of a trapezoidal object slice. When the "EOT" bit is set, this signals that the current trapezoidal object slice being rendered is the last one in the list. Accordingly, after the graphics subsystem finishes rendering this trapezoidal object slice, the rendering task is completed. According to this exemplary embodiment, the default value of the indicators is "not set", i.e., such that the same parameters will be used again to render the next trapezoidal object slice. The indicators of Table 2 are updated for each trapezoidal object slice to be rendered within a complex object. This can be accomplished by, for example, comparing the parameters of each object as it is being generated by the interpreter with the values of the previous set of parameters. The interpreter 416 sends both the set of indicator flags and the new parameter data, if any, for storage in display list 418. The renderer 420 receives the indicators and evaluates this information to update the appropriate registers using the data following the indicators. For example, if only the Y and DXR flags are set, then the renderer 420 will know that the data following the indicator information is to be used to update the Y and DXR registers used by the renderer to create the next object slice. It follows that registers associated with flags that are not set will remain unchanged for the next object slice.

Figure 7:
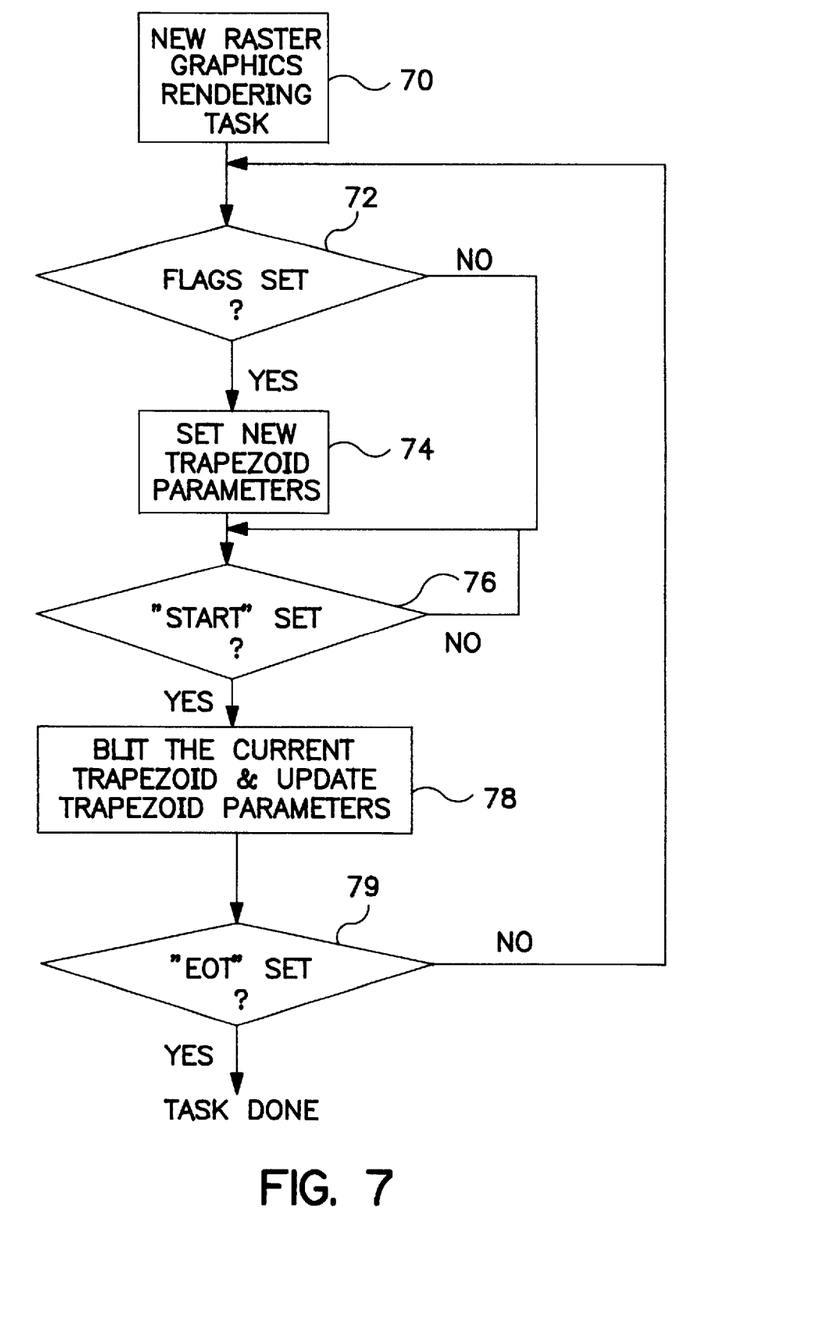
FIG. 7 is a flowchart depicting an exemplary technique for rendering raster graphics according to an exemplary embodiment of the present invention.

FIG. 7 illustrates an exemplary flowchart for rendering a raster graphics object by recursively rendering a list of trapezoidal object slices. Starting with block 70, a new raster graphics rendering task has been submitted to the rendering device. Then, at decision block 72, the indicators received from the display list are evaluated to determine if any of the flags have been set. If any of the flags have been set, then the flow proceeds to block 74 where the new trapezoidal object slice parameters are obtained and used to update the register corresponding to the set flags. Otherwise, the flow follows the "No" branch and skips block 74. In any event, the flow then moves to block 76 wherein it is determined whether the "Start" flag in the indicator register has been set. If not, then the process continues to loop back above block 76 until this flag has been set indicating that rendering of this trapezoidal object slice should begin. The "Start" flag is used in this exemplary embodiment for timing purposes with respect to the rendering hardware, a detailed discussion of which is beyond the scope of this text. Thus those skilled in the art will appreciate that this flag can be omitted if not necessary for other implementations.

Once the "Start" flag has been set, then the flow proceeds to block 78 wherein the current trapezoidal object slice is rendered by blitting each scan line in the trapezoid and then incrementing the trapezoid parameters to create the next line. For example, each trapezoidal object slice is rendered by drawing one scan line at a time from point XL to XR. After drawing each scan line, the trapezoid parameters are incremented as follows before the next scan line can be rendered.

XL←XL+DXL
XR←XR+DXR
Y←Y+1
H←H−1 Once the current trapezoidal object slice is fully rendered, i.e., when H=0, then the flow proceeds to decision block 79. If there are other trapezoidal object slices remaining in the ordered list, then the flow returns to render the next object slice by first determining whether the indicator flags for that object slice have been set. If, however, the "EOT" bit has been set, indicating that the last trapezoidal object slice has been rendered, then the task is complete.

Consider again the object portrayed in FIG. 6. For the first trapezoidal object slice 60, all of the parameter values are stored by the interpreter 416 in the display list and all of the corresponding bit flags are set. The renderer 420 will evaluate the flags and update all of its registers with the parameter information received from the display list 418. Then the renderer will proceed to create object slice 60 as described above with respect to FIG. 7. The interpreter 416 will also determine the parameters for object slice 62. By comparing the newly determined parameters with those determined for object slice 60, the interpreter recognizes that the starting parameters Y', XL', XR' and the slope of the lefthand side DXL' of the second trapezoidal object slice 62 are the same as the corresponding ending parameters of the first trapezoidal object slice 60. Thus, they do not need to be updated. The only parameters which have different values, and thus need to be modified, are H' and DXR' since the height and righthand side slope of the second trapezoidal object slice 62, respectively, differ from that of object slice 60. Therefore, only the indicators associated with parameters H and DXR are set in the header information stored in the display list 418. Similarly, the parameter field sent for intermediate storage in display list 418 only contains values for H' and DXR' of the second trapezoidal object slice 62. When the renderer completes object slice 60 and begins to evaluate object slice 62, e.g. at block 72 of FIG. 7, it receives the header information and new parameter values H' and DXR'. After evaluating the indicators, the renderer updates the registers associated with the H and DXR trapezoidal parameters and proceeds to render object slice 62 using a combination of new and old values.

Those skilled in the art will appreciate that many variations on the foregoing exemplary and illustrative embodiments are within the scope of the present invention. For example, it will be apparent that the ordered list of objects and the indicators can be stored either internally in registers or static rams of the rendering device or externally in any kind of external memory storage device, e.g., DRAM, SRAM, etc. Moreover, the ordered list of objects and indicators need not be stored within or outside the rendering device, but can instead be transmitted elements that are generated algorithmically.

The foregoing description includes parameters of an object slice which describe the boundaries thereof. However, those skilled in the art will also appreciate that other information, such as color information, field patterns, changing grey level, etc., can also be included in the parameters provided for each object and object slice to be rendered. Further, the ordered list of objects and set of indicators can be initialized and updated in any order chosen by the rendering device and need not be initialized and updated from the same source.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What we claim is:

1. A method for storing parameters associated with an object slice to be rendered comprising the steps of:
   determining a first set of parameters defining boundaries of a first object slice to be rendered;
   storing said first set of parameters in a storage device;
   determining a second set of parameters defining boundaries of a second object slice to be rendered;
   comparing said first set of parameters with said second set of parameters; and
   storing in said storage device only those parameters in said second set which differ from corresponding parameters in said first set.

2. The method of claim 1, further comprising the step of:
   storing, in said storage device, header information identifying those of said second set of parameters which have been stored.

3. A method for storing an object slice comprising the steps of:
   determining if any of a plurality of parameters which define boundaries of said object slice are to be updated; and
   selectively storing, based on said step of determining, said plurality of parameters.

4. The method of claim 3, further comprising the step of:
   rendering said object slice using said plurality of parameters.

5. The method of claim 3, wherein said step of determining further comprises the step of:
   evaluating a set of flags, each of which is associated with a respective one of said plurality of parameters.

6. The method of claim 3, wherein said method of selectively storing further includes the step of:
   interpreting a PostScript command to generate a display list.

7. The method of claim 6, wherein said step of selectively storing further comprises the step of:
   selectively storing, based on said step of determining, parameters stored in said display list.

8. A method for transmitting information associated with an object slice comprising the steps of:
   determining if any of a plurality of parameters which define boundaries of said object slice have changed relative to a previously rendered object slice; and
   transmitting, based on said step of determining, those of said plurality of parameters which have changed.

9. The method of claim 8, further comprising the step of:
   rendering said object slice using said transmitted parameters and parameters which were used to render said previously rendered object slice.

10. The method of claim 8, wherein said step of transmitting further comprises the step of:
    transmitting those of said parameters from a host computer to an image forming device.

11. The method of claim 8, wherein said step of transmitting further comprises the step of:
    transmitting those of said parameters from a rendering logic device to a memory device.

12. The method of claim 11, wherein said rendering logic device is an interpreter and said memory display device stores a display list.

13. A device for creating objects using object slices comprising:

means for identifying object slice boundary parameters which are to be updated from one object slice to the next; and a storage device for storing boundary parameters which define each object slice to be rendered, wherein said device transfers values only for those object slice parameters identified by said identifying means to said storage device.

14. The device of claim 13, wherein said identifying means uses a set of indicator registers to identify said object slice parameters which need updating.

15. The device of claim 13, wherein said identifying means is resident in a computer.

16. The device of claim 13, wherein said identifying means is resident in a printer.

17. The device of claim 15, wherein identifying means transmits a header from said computer to an image forming device which indicates that said identified object slice parameters are to be updated.

* * * * *